May 7, 1957

L. A. DURANT ET AL 2,791,152

RADAR CHART PROJECTION PLOTTER AND
FILM PICTURE PROJECTOR APPARATUS

Filed July 9, 1954

INVENTORS.
LYNDON A. DURANT
GUSTAV EHRLER
FRANK MURPHY
BY Clarence E. Threedy
THEIR ATTORNEY.

May 7, 1957

L. A. DURANT ET AL 2,791,152

RADAR CHART PROJECTION PLOTTER AND
FILM PICTURE PROJECTOR APPARATUS

Filed July 9, 1954

INVENTORS.
LYNDON A. DURANT
GUSTAV EHRLER
FRANK MURPHY
BY
THEIR ATTORNEY.

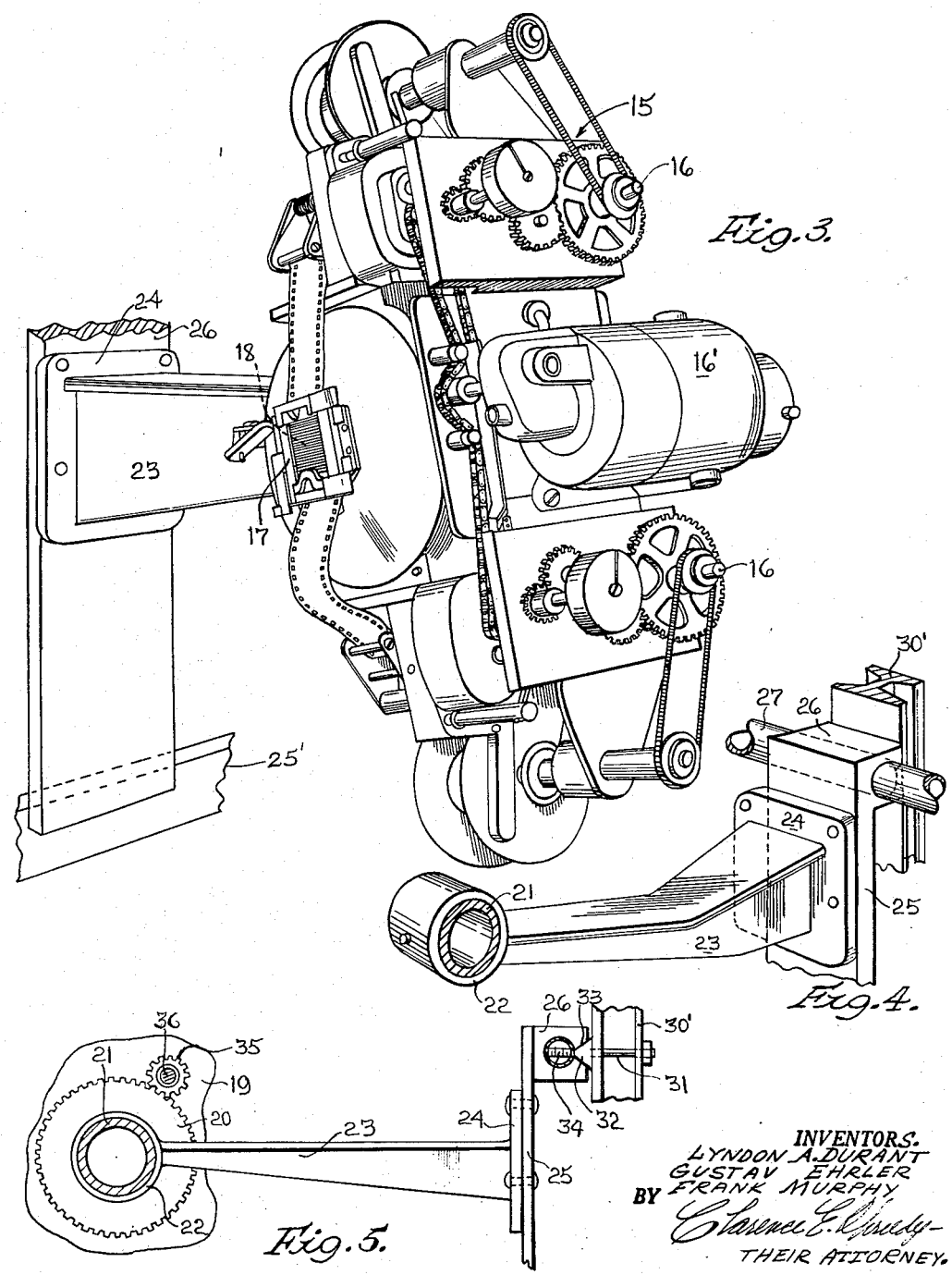

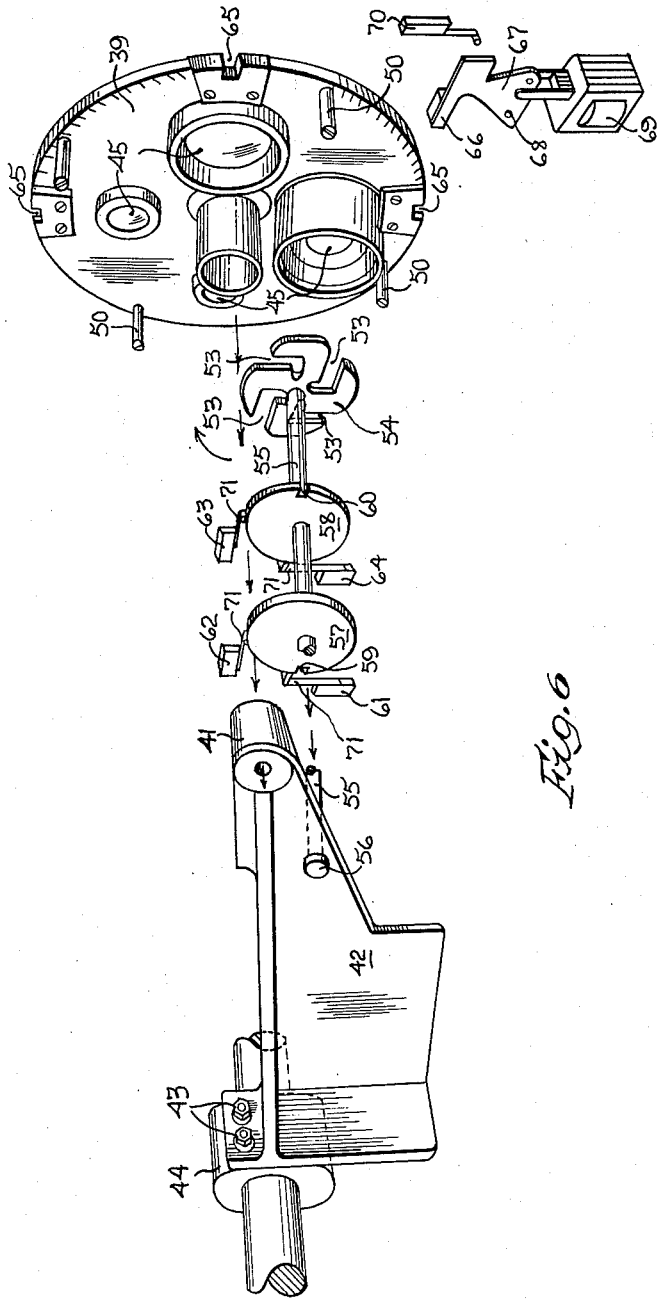

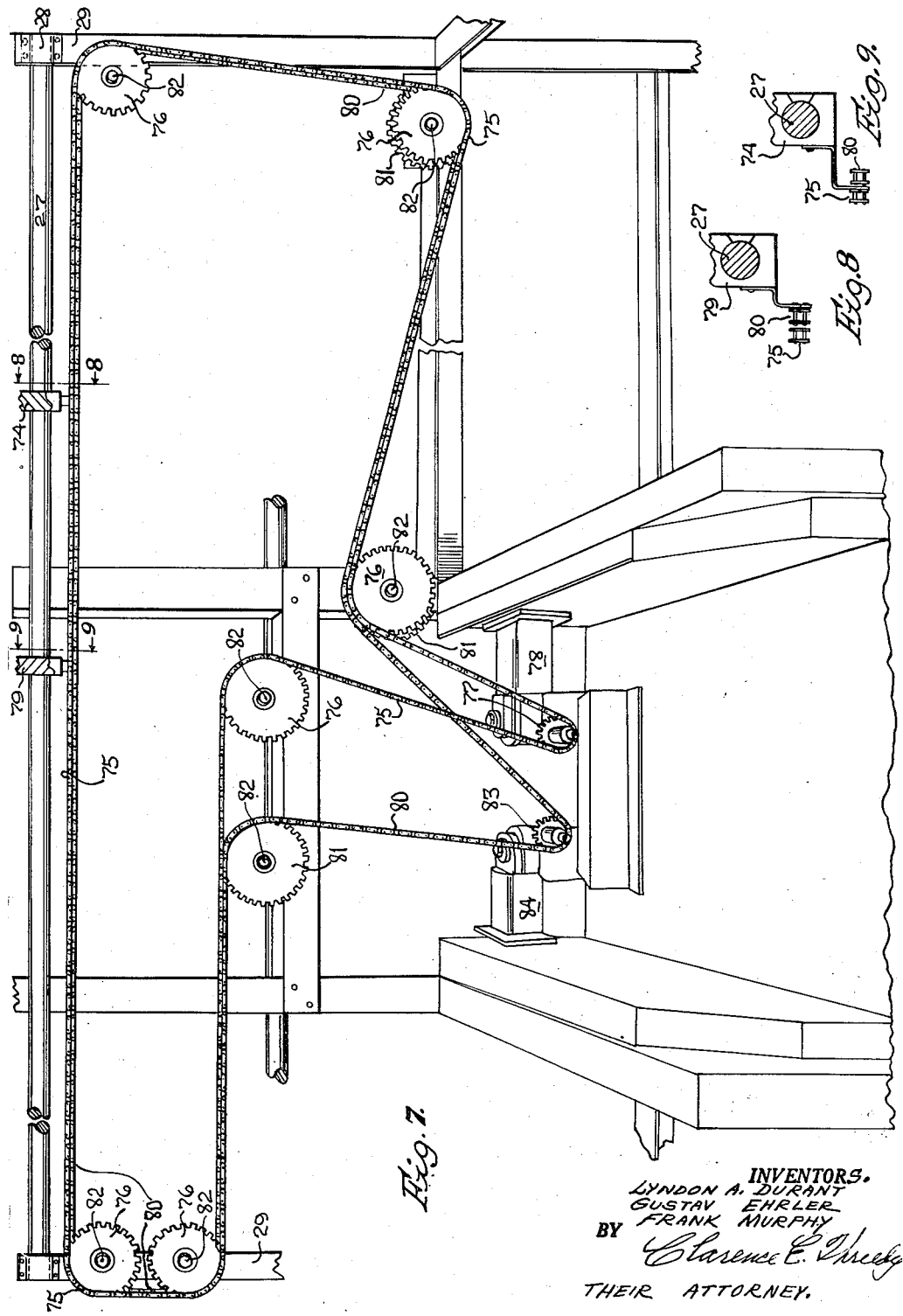

May 7, 1957 L. A. DURANT ET AL 2,791,152
RADAR CHART PROJECTION PLOTTER AND
FILM PICTURE PROJECTOR APPARATUS
Filed July 9, 1954 6 Sheets-Sheet 6

INVENTORS.
LYNDON A. DURANT
GUSTAV EHRLER
FRANK MURPHY
BY Clarence E. Sheedy
THEIR ATTORNEY.

United States Patent Office 2,791,152
Patented May 7, 1957

---

2,791,152

RADAR CHART PROJECTION PLOTTER AND FILM PICTURE PROJECTOR APPARATUS

Lyndon A. Durant, Gustav G. Ehrler, and Frank Murphy, Chicago, Ill., assignors to General Patent Corporation, Chicago, Ill., a corporation of Illinois Application July 9, 1954, Serial No. 442,396

7 Claims. (Cl. 88—24)

This invention relates to a radar chart projection plotter and film picture projector apparatus, a principal object of which is to facilitate the plotting of radar scope photography by projection upon a chart for locating and mapping upon which chart objects or the like of the area photographed.

The area or territory photographed may be either photographed directly on a 35 mm. film or photographed directly from the radar screen as the object or objects present themselves upon the radar screen.

Our invention provides a novel and effective arrangement for projecting the picture upon a chart having thereon the area photographed, whereby the operator can, by means of such projected photograph upon the chart, locate the objects which have presented themselves upon the radar screen or which have been photographed upon a 35 mm. film.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 3 is a perspective view of a 35 mm. projecting apparatus embodied in my invention;

Fig. 4 is a fragmentary perspective view of a mounting arm for the apparatus shown in Fig. 3;

Fig. 5 is a fragmentary side sectional detail view of the mounting arm shown in Fig. 4, taken substantially on line 5—5 of Fig. 12;

Fig. 6 is a perspective view of a lens turret and its actuating parts, the latter shown in exploded relation;

Fig. 7 is a fragmentary perspective view of the chain operating mechanism for the projector and lens turret embodied in my invention;

Fig. 8 is a fragmentary sectional detail view taken substantially on line 8—8 of Fig. 7;

Fig. 9 is a fragmentary sectional detail view taken substantially on line 9—9 of Fig. 7;

Figure 1:
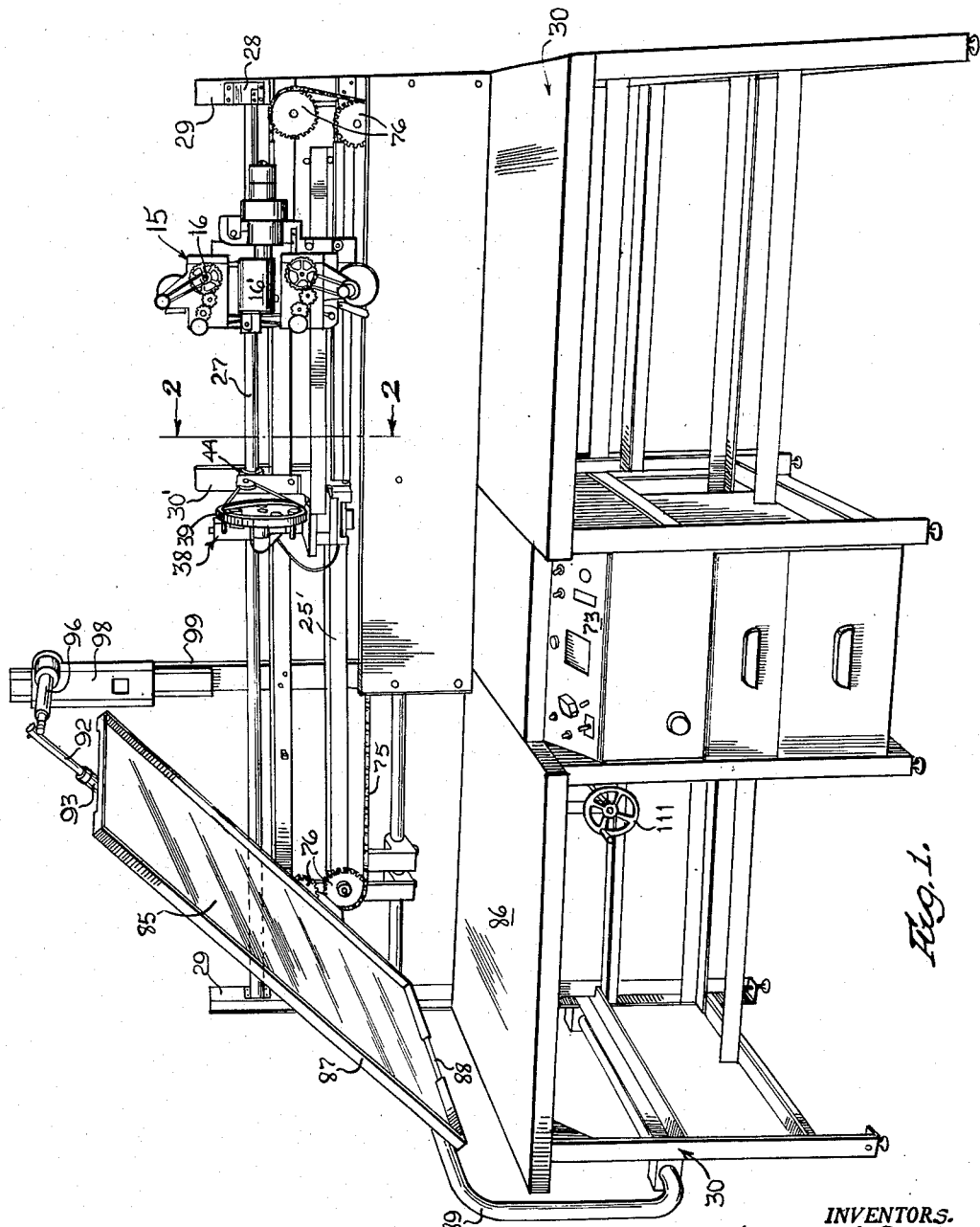
Fig. 1 is a perspective view of our improved radar projection plotter.
Figure 2:
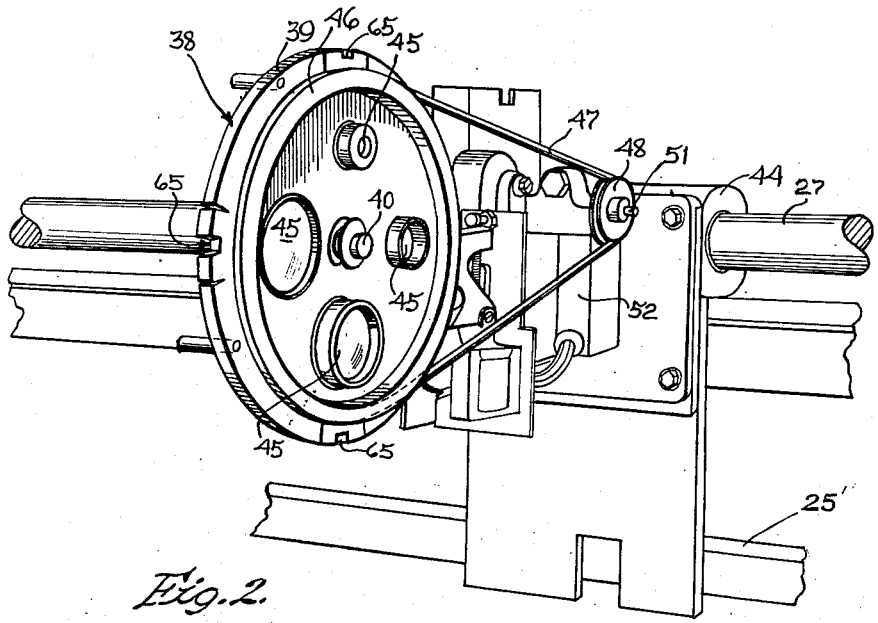
Fig. 2 is a fragmentary perspective view taken substantially on line 2—2 of Fig. 1.

The basic equipment embodied in our invention consists of a 35 mm. projector preferably capable of holding one hundred feet of 35 mm. film. Such a projector is indicated at 15 and includes the usual and conventional film drive mechanism 16 including a driving motor 16′ (Fig. 3) and a film gate 17 through which the film passes over the light aperture 18.

The film driving mechanism per se embodies no part of our invention and is of the standard type by which the film may be advanced or retracted through the film gate 17.

This projector 15 is mounted for rotation through a path of 360° for purposes to be more fully hereinafter set forth. This mounting and rotation of the projector 15 through such path is accomplished by attaching to a wall 19 of the projector 15 a gear 20, which gear 20 is mounted for rotation upon a tubular shaft 21 in turn fixedly mounted in a bearing 22 (Fig. 5) formed as an integral part of a supporting arm 23. This arm 23 extends laterally from a plate 24 fixedly secured to a depending flange 25 carried by a bearing block 26. The bearing block 26 embraces a rod 27 having its end portions mounted in brackets 28 provided by upstanding posts 29 provided by a table structure 30. An intermediate supporting post 30′ for the rod 27 carries a mounting bolt 31 having a conically shaped body 32 which passes through a similarly shaped groove 33 formed in the block 26 so that movement of the block 26 and consequently movement of the projector 15 may be in a longitudinal direction of the rod 27 without interference from the post 30′; the bolt 31 having a threaded end portion 34 which is threaded into the rod 27. The means for moving the projector 15 longitudinally of the rod 27 will be presently described.

Figure 12:
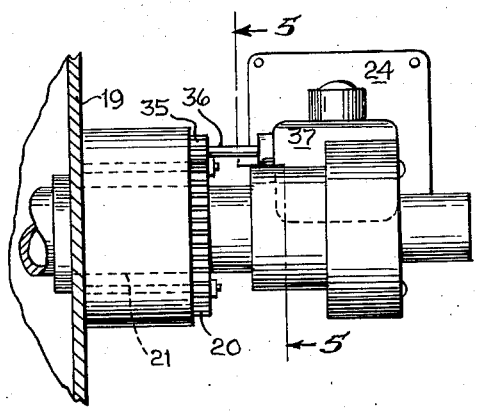
Fig. 12 is a fragmentary side elevational view of the projector rotating mechanism embodied in our invention.
Figure 10:
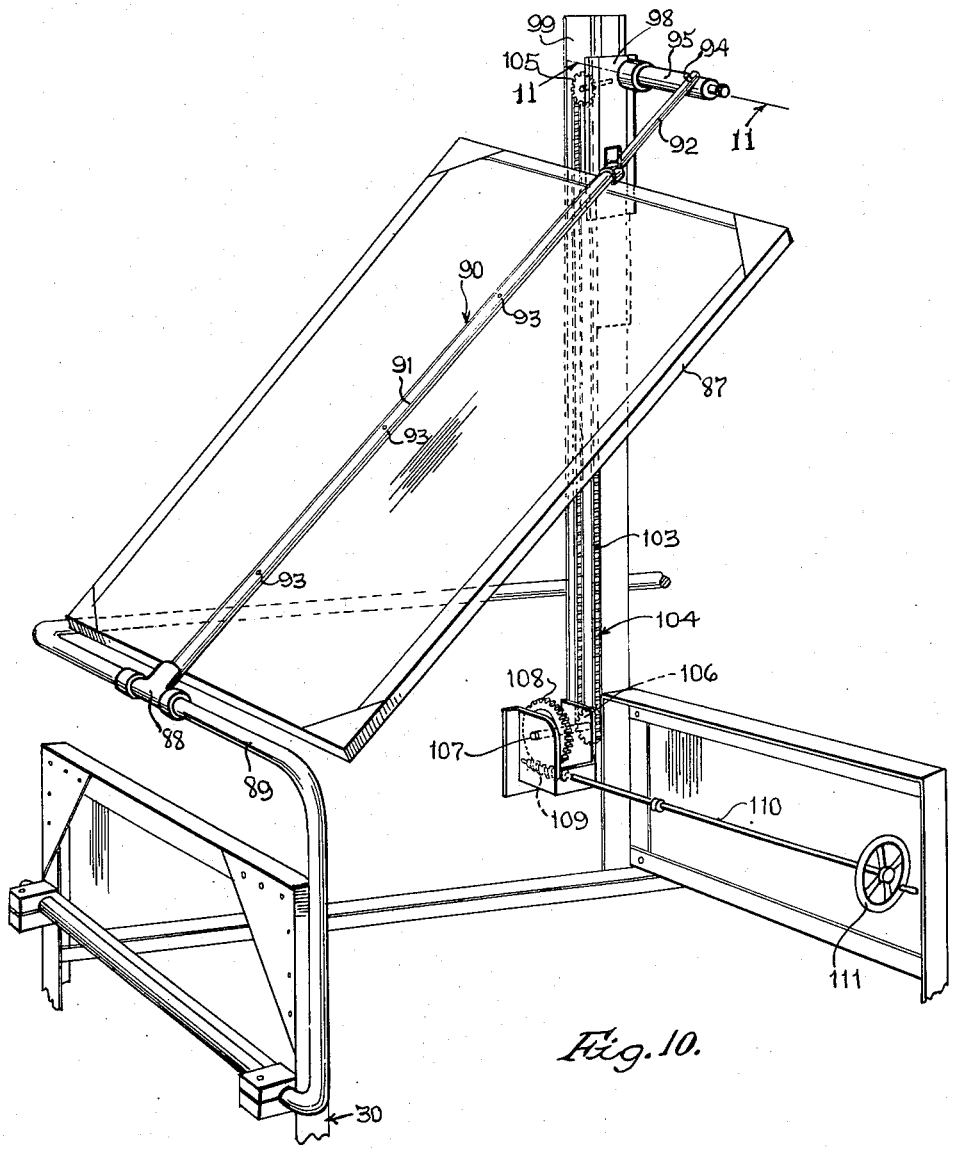
Fig. 10 is a fragmentary perspective view of a mirror mounting and its actuating mechanism embodied in our invention.

The gear 20 is driven by a pinion 35 mounted on a shaft 36 (Fig. 12) of a motor 37.

Mounted on the rod 27 for movement longitudinally with respect thereto is a lens turret 38. This lens turret 38 comprises a turret disc 39 mounted for rotation on a shaft 40 journalled in a bearing 41 provided by an arm 42 connected as at 43 to a bearing 44 similar to the block 26 and of a construction similar thereto. This disc 39 carries at least four lenses 45 of different focal lengths. Each lens 45 is adjusted for aligned position with respect to the light aperture 18. This adjustment is accomplished by providing on the turret disc a grooved pulley 46. This pulley 46 by means of a belt 47 has operative connection with a pulley 48. Extending laterally from one side of the disc 39 are spaced pins 50. The pulley 48 is mounted on a shaft 51 of a motor 52. The pins 50 are adapted to engage in bayonet slots 53 formed in a disc 54 mounted on a shaft 55 journalled in a suitable bearing 56 (Fig. 6).

On this shaft 55 are mounted a pair of discs 57 and 58. Each of these discs is provided at predetermined points with detent notches 59 and 60. Associated with each of these discs 57 and 58 are switch elements 61, 62, 63 and 64.

In the turret disc 39 are notches 65 adapted to have projected therein at a predetermined point of rotation of the disc 39 a latch 66 of a latch arm 67 pivoted to the arm 42 as at 68. This latch arm 67 is controlled by an electromagnetic solenoid 69. Whenever the coil of the solenoid 69 is excited, the arm 67 will be withdrawn from the notch of the notches 65 in which it is engaged, to release the disc 39 for rotation under the action of the motor 52. This motor is initially energized by the closing of a switch 70 by the action of the latch arm 67. The rotation of the disc 39 to its selected position with the desired lens in alignment with the light aperture of the projector, is controlled by the action of the switches 61 to 64 inclusive, each of which controls the coil of the solenoid 69 at a time when the actuating arm 71 of the switches 61 to 64 inclusive engages its respective detent notch 59, at which time the latch arm 67 will be pivoted to dispose its latch 66 into the adjacent notch 65 and at the same time open the switch 70 to deenergize the motor 52.

By this arrangement, from a suitable control board 73 the operator may manually select the proper lens 45 for the projection of the picture from the projector.

The lens turret and the projector may be moved independently of each other for proper focus or simultaneously, whichever is required or desirable.

A balance bar 25' is provided to retain the projector and turret in their proper position upon the rod 27.

The projector, as shown in Fig. 7, has a wall structure 74 thereof connected to a continuous chain link 75 which is payed over gears 76 and over a driving pinion 77 mounted on a shaft of a motor 78. The turret lens through an element 79 thereof is likewise connected to a continuous chain link 80 payed over gears 81 in facial abutment with the gears 76 and mounted upon the same shafts 82 as are the gears 76. This chain 80 is payed over a pinion 83 of a motor 84.

By providing independent chain drives for the turret and the projector, the turret and projector may be adjusted relative to each other to produce a proper focus on the chart hereinafter referred to. The picture from the projector is projected through the selected lens of the turret 38 upon a mirror 85, and from the mirror it is reflected upon a chart table 86 upon which is placed the chart for charting the location of the objects of the picture thus projected.

This mirror 85 is mounted within a frame 87 and is hingedly supported as at 88 to a supporting arm 89 carried by the table structure 30. This mirror 85 is adapted to be adjusted about a horizontal axis within a limited range.

Figure 11:
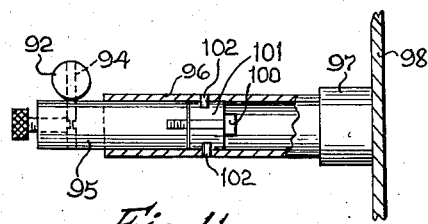
Fig. 11 is a fragmentary sectional detail view taken substantially on line 11—11 of Fig. 10.

This is accomplished by attaching to the back of the mirror a tube 90 comprising telescopically arranged sections 91 and 92. The tube 91 is secured to the frame back as at 93. The tube 92 by means of a pin 94 (Fig. 11) is secured to a stud shaft 95 which is rotatably mounted in a sleeve 96 extending from a bearing 97 carried by a slide plate 98 slidably mounted upon a post 99 for vertical adjustment. The stud shaft 95 by a bolt 100 is connected to a fixed plug 101 fixed as at 102 within the sleeve 96.

The arrangement is such that when the slide plate 98 is moved vertically within a limited range relative to the post 99, the mirror 85 will be adjusted about a horizontal axis to properly reflect the picture element from the projector upon a chart mounted on the chart table 86. This movement of the slide plate 98 is accomplished by attaching the plate 98 to one run 103 of a continuous chain 104 extended around the gears 105 and 106. The gear 106 is mounted on a shaft 107, on which shaft is mounted a driven gear 108 meshing with a worm gear 109, which latter gear is fixed to one end of a shaft 110 having at its opposite end a hand wheel 111.

Summarily, the turret lens is adjusted in proper relation with respect to the projector. Then by operation of the motors 78 and 84, the lens turret and the projector are adjusted relative to the mirror 85 to a position where the picture projected through the lens turret will be reflected upon a chart mounted on the chart table 86. To facilitate coordination of the chart and the projected picture so that proper registration will result therebetween, the mirror 85 may be adjusted within a limited range. The proper focal point between the projector and the lens may be accomplished by adjusting the lens turret and the projector. The operator may select a proper lens in the manner hereinbefore set forth with respect to the mechanism shown in Fig. 6 for adjusting such turret.

By the arrangement herein described, a photograph of a radar scope or other picture taken upon 35 mm. film may by means of the projector and turret lens be reflected by the mirror 85 upon the chart mounted on the charting table 86, thereby to enable the operator to locate points of interest or importance developed by the taking of the radar scope or other picture.

The projector may be continuously operated or may be held to a position where only one frame is projected through the lens, thus enabling the operator to study the picture as reflected by the mirror on the charting table 86.

The means for adjusting the projector and the lens is to some extent schematically illustrated as well as the means for adjusting the mirror, as we do not wish to be limited to any precise form for accomplishing these functions. We believe that our invention is broadly new in the employment of a projector and lens turret for projecting a radar scope or other picture upon a mirror for reflection by the mirror upon a chart of the area photographed, thereby enabling, as before stated, the operator to pinpoint important objects and locations on the chart as evidenced to him by the reflected radar scope or other picture.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A photographic chart projection device comprising in operative optical alignment a film picture projector, adjustable supporting and mounting means for said film picture projector for rotation about a projection axis, lens turret means having a plurality of lenses of different focal lengths, means for mounting and supporting said lens turret means and said film picture projector for separate and simultaneous movement along a common optical axis in a common plane, a reflector means at a point forward of and optically aligned with the lens turret means and the chart projection surface of a charting screen means, a charting table supporting the charting screen means and in angular relation with respect to the reflector means and in optical alignment therewith, means for simultaneously and separately moving said lens turret means and said film picture projector along and about the optical projection axis in said common plane toward and away from said reflector means to focus the projected image from the film picture projector upon the charting screen means, means for rotatably adjusting said lens turret means for aligning a selected lens on the optical axis of the film picture projector, and motor operated means for rotatably adjusting the film picture projector axially with respect to its mounting means whereby the projected image may be rotated relative to the chart projection surface of the charting screen means.

2. The device as defined in claim 1 wherein there is a means for angularly adjusting the reflector means relative to said charting table to focus the projected image from the film picture projector upon the charting screen means.

3. The device as defined in claim 1 wherein there is a means for releasably latching a selected lens of said lens turret means in optical alignment with said film picture projector.

4. A photographic chart projection device comprising in operative optical alignment a film picture projector, adjustable supporting and mounting means for said film picture projector for rotation about a projection axis, lens turret means having a plurality of lenses of different focal lengths, means for mounting and supporting said lens turret means and said film picture projector for separate and simultaneous movement along a common optical axis in a common plane, a reflector means at a point forward of and optically aligned with the lens turret means and the chart projection surface of a charting screen means and in angular relation with respect to the reflector means and in optical alignment therewith, means for simultaneously and separately moving said lens turret means and said film picture projector along and about the optical projection axis in said common plane toward and away from said reflector means to focus the projected image from the film picture projector upon the charting screen means, motor operated pulley means for rotatably adjusting said lens turret means for aligning a selected lens on the optical axis of the film picture projector, and motor operated gears for rotatably adjusting the film picture projector axially with respect to its mounting means whereby the projected image may be rotated relative to the chart projection surface of the charting screen means.

5. A photographic chart projection device comprising in operative optical alignment a film picture projector, adjustable supporting and mounting means for the film picture projector for rotation about the projection axis, lens turret means having a plurality of lenses of different focal lengths, means for mounting and supporting said lens turret means and said film picture projector for separate and simultaneous movement along a common optical axis in a common plane, a reflector means at a point forward of and optically aligned with the lens turret means and the chart projection surface of a charting screen means, a charting table supporting the charting screen means and in angular relation with respect to the reflector means and in optical alignment therewith, means for angularly adjusting the reflector means relative to said charting table to focus the projected image from the film picture projector upon the charting screen means, means for simultaneously and separately moving said lens turret means and said film picture projector along and about the optical projection axis in said common plane toward and away from said reflector means to focus the projected image from the film picture projector upon the charting screen means, means for releasably latching a selected lens of said lens turret means in optical alignment with said film picture projector, means for rotatably adjusting said lens turret means for aligning a selected lens on the optical axis of the film picture projector, and motor operated means for rotatably adjusting the film picture projector axially with respect to its mounting means whereby the projected image may be rotated relative to the chart projection surface of the charting screen means.

6. A photographic chart projection device comprising in operative optical alignment a film picture projector, adjustable supporting and mounting means for said film picture projector for rotation about a projection axis, lens turret means having a plurality of lenses of different focal lengths, means for mounting and supporting said lens turret means and said film picture projector for separate and simultaneous movement along a common optical axis in a common plane, a reflector means at a point forward of and optically aligned with the lens turret means and the chart projection surface of a charting screen means, a charting table supporting the charting screen means and in angular relation with respect to the reflector means and in optical alignment therewith, means for angularly adjusting the reflector means relative to said charting table to focus the projected image from the film picture projector upon the charting screen means, means for simultaneously and separately moving said lens turret means and said film picture projector along and about the optical projection axis in said common plane toward and away from said reflector means to focus the projected image from the film picture projector upon the charting screen means, motor operated pulley means for rotatably adjusting said lens turret means for aligning a selected lens on the optical axis of the film picture projector, and motor operated gears for rotatably adjusting the film picture projector axially with respect to its mounting means whereby the projected image may be rotated relative to the chart projection surface of the charting screen means.

7. A photographic chart projection device comprising in operative optical alignment a film picture projector, adjustable supporting and mounting means for said film picture projector for rotation about a projection axis, lens turret means having a plurality of lenses of different focal lengths, means for mounting and supporting said lens turret means and said film picture projector for separate and simultaneous movement along a common optical axis in a common plane, a reflector means at a point forward of and optically aligned with the lens turret means and the chart projection surface of a charting screen means, a charting table supporting the charting screen means and in angular relation with respect to the reflector means and in optical alignment therewith, means for angularly adjusting the reflector means relative to said charting table to focus the projected image from the film picture projector upon the charting screen means, means for simultaneously and separately moving said lens turret means and said film picture projector along and about the optical projection axis in said common plane toward and away from said reflector means to focus the projected image from the film picture projector upon the charting screen means, motor operated pulley means for rotatably adjusting said lens turret means for aligning a selected lens on the optical axis of the film picture projector, means for releasably latching a selected lens of said lens turret means in optical alignment with said film picture projector, and motor operated gears for rotatably adjusting the film picture projector axially with respect to its mounting means whereby the projected image may be rotated relative to the chart projection surface of the charting screen means.

References Cited in the file of this patent

UNITED STATES PATENTS

| | | |
|---|---|---|
| 494,128 | Decker | Mar. 28, 1893 |
| 1,242,674 | Fleischer | Oct. 9, 1917 |
| 1,612,800 | Brock | Jan. 4, 1927 |
| 1,655,306 | Barr et al. | Jan. 3, 1928 |
| 2,053,073 | Gardner | Sept. 1, 1936 |
| 2,090,270 | Swanson | Aug. 17, 1937 |
| 2,125,553 | Fourcade | Aug. 2, 1938 |
| 2,374,981 | Cooke | May 1, 1945 |
| 2,431,612 | Furnas | Nov. 25, 1947 |
| 2,586,743 | Thresher et al. | Feb. 19, 1952 |
| 2,591,139 | Critoph | Apr. 1, 1952 |

FOREIGN PATENTS

| | | |
|---|---|---|
| 157,236 | Great Britain | July 10, 1922 |
| 362,596 | Germany | Oct. 30, 1922 |
| 254,301 | Great Britain | Jan. 6, 1927 |
| 1,030,402 | France | Mar. 11, 1953 |